United States Patent
Mattsson et al.

(10) Patent No.: US 12,387,158 B2
(45) Date of Patent: Aug. 12, 2025

(54) RULES-BASED TRAINING OF FEDERATED MACHINE LEARNING MODELS

(71) Applicant: International Business Machines Corporation, Armonk, NY (US)

(72) Inventors: Thomas Alexander Bertil Mattsson, Staffanstorp (SE); Bilal Abdullah Abdullah Al-Saeedi, Munich (DE)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 17/302,602

(22) Filed: May 7, 2021

(65) Prior Publication Data

US 2022/0358425 A1  Nov. 10, 2022

(51) Int. Cl.
*G06Q 10/0635*  (2023.01)
*G06F 18/214*  (2023.01)
*G06N 20/00*  (2019.01)

(52) U.S. Cl.
CPC ..... *G06Q 10/0635* (2013.01); *G06F 18/2148* (2023.01); *G06N 20/00* (2019.01)

(58) Field of Classification Search
CPC .. G06Q 10/0635; G06K 9/6257; G06N 20/00; G06F 18/2148
See application file for complete search history.

(56) References Cited

U.S. PATENT DOCUMENTS

| | | | |
|---|---|---|---|
| 11,238,376 B1 * | 2/2022 | Mudgil | G06F 18/23 |
| 11,551,117 B1 * | 1/2023 | Malhotra | G06Q 50/26 |
| 2016/0217388 A1 * | 7/2016 | Okanohara | G06N 20/00 |
| 2019/0042937 A1 | 2/2019 | Sheller | |
| 2019/0163848 A1 * | 5/2019 | McGranahan | G06F 11/3447 |
| 2020/0027019 A1 | 1/2020 | Yang | |
| 2020/0034665 A1 | 1/2020 | Ghanta | |
| 2020/0387675 A1 * | 12/2020 | Nugent | G06N 3/045 |
| 2021/0166157 A1 * | 6/2021 | Bhowmick | G06N 3/04 |

FOREIGN PATENT DOCUMENTS

| | | |
|---|---|---|
| CN | 106779380 A | 5/2017 |
| CN | 107220786 A | 9/2017 |
| CN | 108596447 A | 9/2018 |
| IN | 201911008643 A | 3/2019 |

(Continued)

OTHER PUBLICATIONS

Orbacho, Jose, "Federated Learning—Bringing Machine Learning to the edge with Kotlin and Android", Published in Medium, United States, Apr. 29, 2018, 13 Pages (Year: 2018).*

(Continued)

*Primary Examiner* — Eric J. Bycer
(74) *Attorney, Agent, or Firm* — Kelsey Skodje

(57) ABSTRACT

Approaches presented herein enable training a federated machine learning model. More specifically, data is received from one or more sensors associated with an edge device. In response to the data exceeding a pre-determined threshold, a hazardous condition is identified. The hazardous condition is classified as valid or invalid, and in response to the hazardous condition being classified as valid, the hazardous condition and the data from one or more sensors are applied to the federated machine learning model.

20 Claims, 5 Drawing Sheets

(56) References Cited

FOREIGN PATENT DOCUMENTS

WO 2012034069 A1 3/2012
WO 2017055878 A1 4/2017

OTHER PUBLICATIONS

McMahan et al., "Federated Learning: Collaborative Machine Learning without Centralized Training Data", Google AI Blog, Apr. 6, 2017, 7 Pages (Year: 2017).*
Corbacho, Jose, "Federated Learning—Bringing Machine Learning to the edge with Kotlin and Android", Published in Medium, United States, Apr. 29, 2018, 3 Pages, <https://proandroiddev.com/federated-learning-e79e054c33ef>.
Li et al., "Federated Learning: Challenges, Methods, and Future Directions", arXiv:1908.07873v1, [cs.LG], United States, Aug. 21, 2019, 21 Pages.
McMahan et al., "Federated Learning: Collaborative Machine Learning without Centralized Training Data", Google AI Blog, Apr. 6, 2017, 3 Pages, <https://ai.googleblog.com/2017/04/federated-learning-collaborative.html>.

* cited by examiner

RULES-BASED TRAINING OF FEDERATED MACHINE LEARNING MODELS

TECHNICAL FIELD

The present invention relates generally to training federated machine learning models and, more specifically, to using rules to classify sensor data generated on edge devices, such that the classified sensor data is used to train federated machine learning models.

BACKGROUND

Federated machine learning models enable distributed training of a machine learning model across multiple decentralized edge devices or servers, each having disparate datasets. This approach differs from conventional centralized machine learning techniques where local datasets are uploaded to a single system. Federated machine learning models allow multiple actors to build a consolidated machine learning model without sharing data, thus addressing issues such as data privacy, data security, data access rights, and access to heterogeneous data.

SUMMARY

Approaches presented herein enable training a federated machine learning model. More specifically, data is received from one or more sensors associated with an edge device. In response to the data exceeding a pre-determined threshold, a hazardous condition is identified. The hazardous condition is classified as valid or invalid, and in response to the hazardous condition being classified as valid, the hazardous condition and the data from one or more sensors are applied to the federated machine learning model.

One aspect of the present invention includes a method for training a federated machine learning model, the method comprising: receiving data from one or more sensors associated with an edge device, responsive to the data exceeding a pre-determined threshold, identifying a hazardous condition, classifying the hazardous condition as valid or invalid, and responsive to classifying the hazardous condition as valid, applying the hazardous condition and the data from one or more sensors to the federated machine learning model.

Another aspect of the present invention includes a computer system for training a federated machine learning model, the computer system comprising: a memory medium comprising program instructions, a bus coupled to the memory medium, and a processor, for executing the program instructions, coupled to a federated machine learning model training engine via the bus that when executing the program instructions causes the system to: receive data from one or more sensors associated with an edge device, responsive to the data exceeding a pre-determined threshold, identify a hazardous condition, classify the hazardous condition as valid or invalid, and responsive to classifying the hazardous condition as valid, apply the hazardous condition and the data from one or more sensors to the federated machine learning model.

Yet another aspect of the present invention includes a computer program product for training a federated machine learning model, the computer program product comprising a computer readable hardware storage device, and program instructions stored on the computer readable hardware storage device, to: receive data from one or more sensors associated with an edge device, responsive to the data exceeding a pre-determined threshold, identify a hazardous condition, classify the hazardous condition as valid or invalid, and responsive to classifying the hazardous condition as valid, apply the hazardous condition and the data from one or more sensors to the federated machine learning model.

Still yet, any of the components of the present invention could be deployed, managed, serviced, etc., by a service provider who offers to implement training a federated machine learning model in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
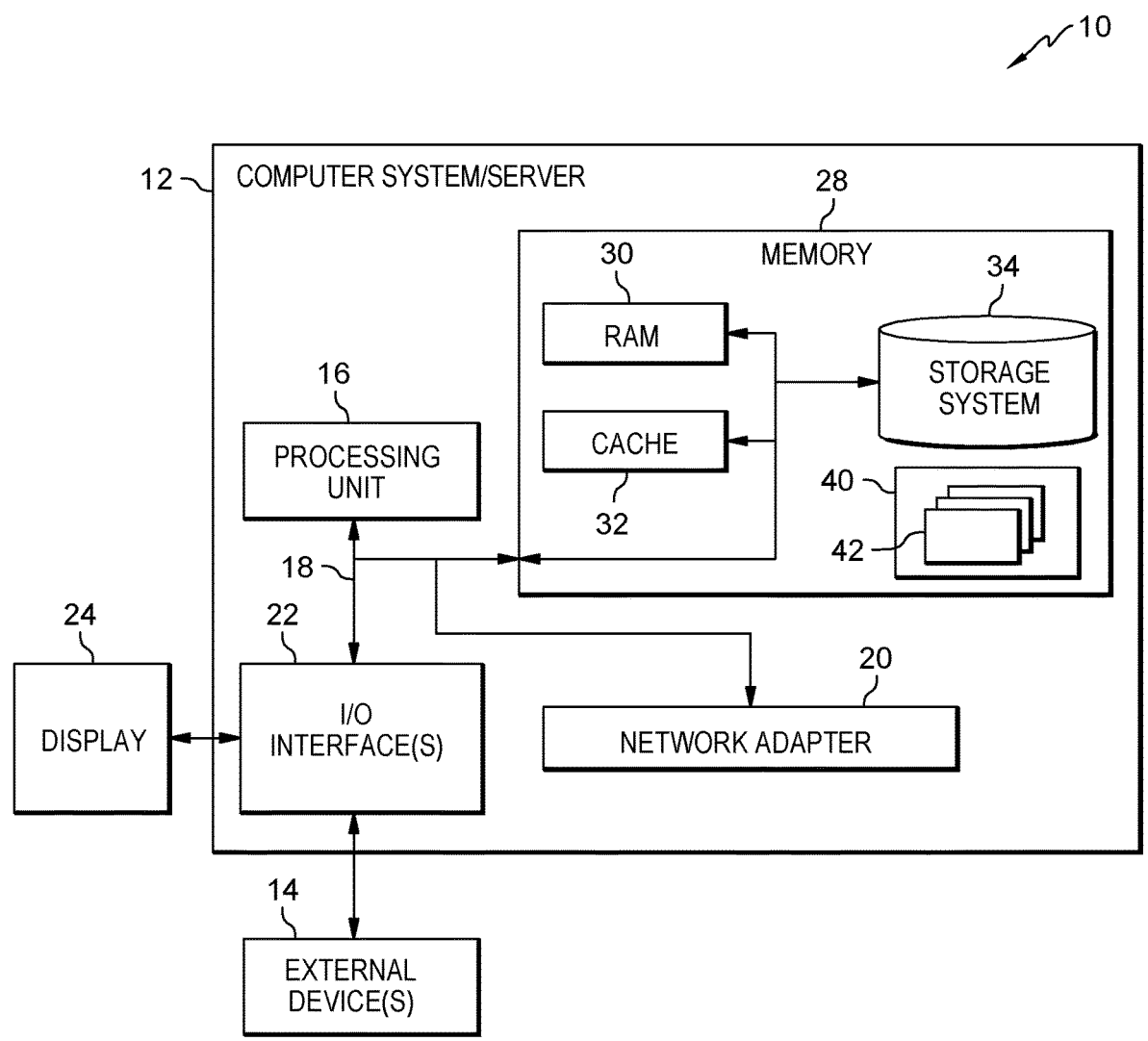
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for training a federated machine learning model. More specifically, data is received from one or more sensors associated with an edge device. In response to the data exceeding a pre-determined threshold, a hazardous condition is identified. The hazardous condition is classified as valid or invalid, and in response to the hazardous condition being classified as valid, the hazardous condition and the data from one or more sensors are applied to the federated machine learning model.

Referring now to FIG. 1, a computerized implementation 10 of an embodiment for training a federated machine learning model will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for training a federated machine learning model. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth®, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for training a federated machine learning model, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/ non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that gathering raw sensor data necessary for training a federated machine learning model may present some privacy issues with respect to sensitive personal information. An additional challenge is providing proper and correct classification and labeling of data needed to implement the training of a federated machine learning model.

Accordingly, the inventors of the present invention have developed a system that anonymizes data used to train a federated machine learning model on an edge device when the federated model is contributed to a central machine learning model in the cloud. The present invention also provides a system to classify and label data that is used to train a federated machine learning model.

Figure 2:
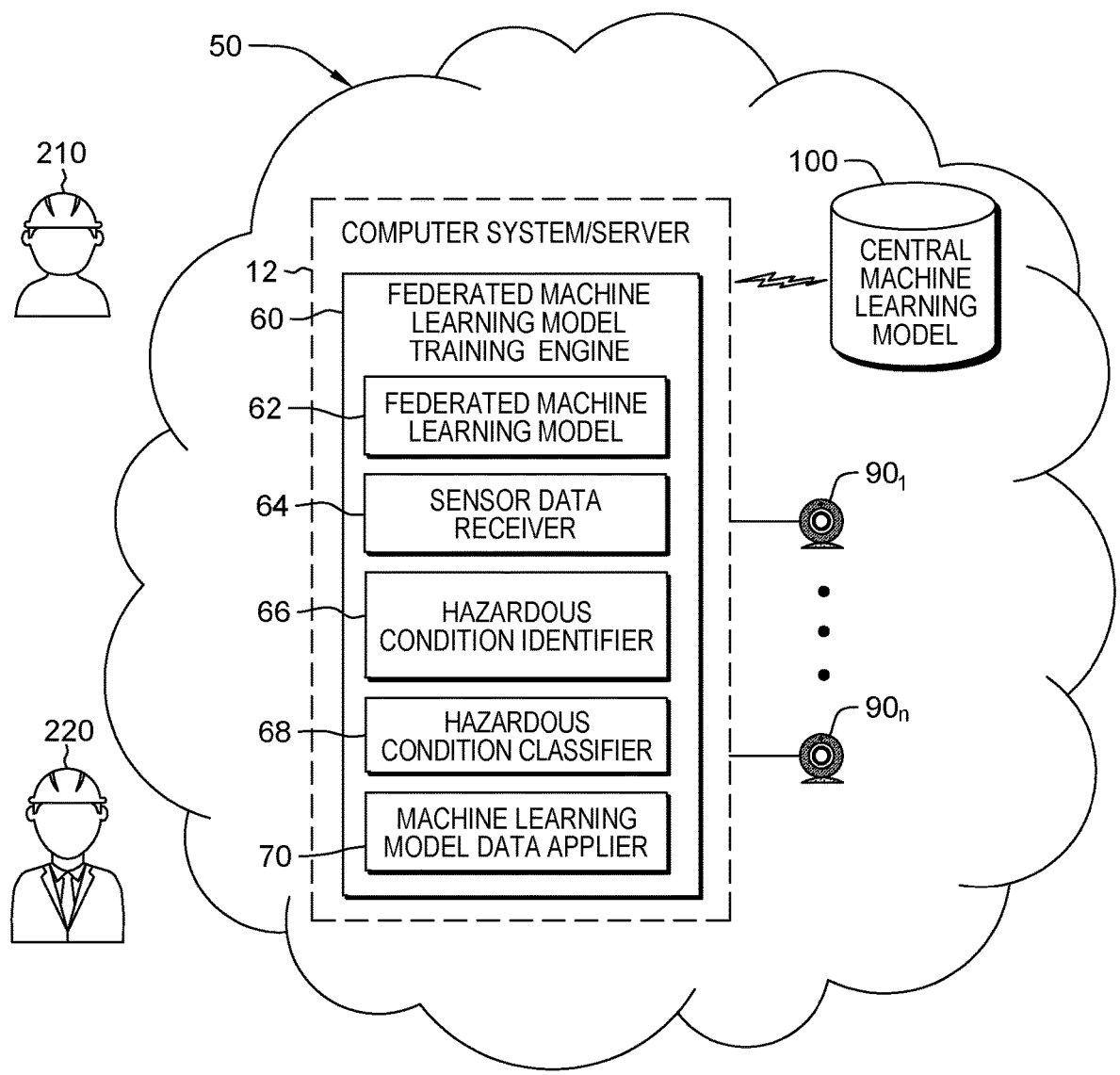
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12, in one example an edge computer system, is shown in FIG. 2 for illustrative purposes only. In the event the teachings recited herein are practiced in a networked computing environment, each client need not have a federated machine learning model training engine 60 (hereinafter "system 60"). Rather, all or part of system 60 could be loaded on a server or server-capable device that communicates (e.g., wirelessly) with the clients to provide for training a federated machine learning model. Regardless, as depicted, system 60 is shown within computer system/server 12. In general, system 60 can be implemented as program/utility 40 on computer system/server 12 of FIG. 1 and can enable the functions recited herein.

Along these lines, system 60 may perform multiple functions. Specifically, among other functions, system 60 can train a federated machine learning model in a networked computing environment. To accomplish this, system 60 can include a set of components (e.g., program modules 42 of FIG. 1) for carrying out embodiments of the present invention. These components can include, but are not limited to, federated machine learning model 62, sensor data receiver 64, hazardous condition identifier 66, hazardous condition classifier 68, and machine learning model data applier 70.

Through computer system/server 12, system 60 may receive sensor data from one or more sensors $90_1$-$90_n$ which may comprise, for example, at least one of: an accelerometer, a gyroscopic sensor, a biometric sensor, an air quality sensor, a video imaging sensor, a radar/proximity sensor, and a microphone. System 60 may communicate with central machine learning model 100 so as to perform a consolidation of federated machine learning model 62 with model 100.

In one embodiment, system 60 may be implemented as an edge computing device, for example a smartphone. System 60 may be used by user 210, in one example an employee, and/or supervisor 220, in one example an employee supervisor of user 210, to train federated machine learning model 62. As mentioned above, system 60 may receive sensor data from one or more sensors $90_1$-$90_n$ using sensor data receiver 64 which performs functions related to receiving data, for example, converting analog readings received from sensors to digital values.

Responsive to the data received by sensor data receiver 64 from one or more sensors $90_1$-$90_n$ exceeding a pre-determined threshold, hazardous condition identifier 66 may identify a hazardous condition. The pre-determined threshold for hazardous condition identifier 66 to identify a hazardous condition may be determined and set based on a sliding window of values, i.e. values falling between a set of boundary conditions, as well as other known algorithms. The hazardous conditions identified by hazardous condition identifier 66 may comprise, for example, at least one of: a fall event, an impact event, excessive heart rate, elevated blood pressure, lowered body temperature, elevated body temperature, elevated stress level, excessive fatigue, reduced oxygen level, elevated noxious gas level, and elevated sound level. In one embodiment, hazardous condition identifier 66 may be implemented using one or more rules, where identifying a hazardous condition is performed by meeting one or more conditions defined in a rule of the one or more rules, and the rule is executed by a rules-engine.

The one or more rules are also known as "shields", for example: fall shield, air quality shield, vibration shield, noise shield, etc. For example, a pre-determined threshold of 100 dB may be set for the noise shield, and if a noise above that sound level is detected by a sensor of one or more sensors $90_1$-$90_n$, hazardous condition identifier 66 may identify a hazardous noise level that could potentially cause a hearing loss from prolonged exposure.

If hazardous condition identifier 66 identifies a hazardous condition, hazardous condition classifier 68 prompts user 210 and/or supervisor 220 to enter or indicate a classification of the identified hazardous condition. Hazardous condition classifier 68 classifies the identified hazardous condition as valid or invalid based upon input received from user 210 and/or supervisor 220. For example, if the identified hazardous condition is a false positive, then user 210 and/or supervisor 220 may indicate that hazardous condition classifier 68 should classify the identified hazardous condition as invalid. Alternatively, if the identified hazardous condition was correctly identified, then user 210 and/or supervisor 220 may indicate that hazardous condition classifier 68 should classify the identified hazardous condition as valid.

In response to hazardous condition classifier 68 classifying the identified hazardous condition as valid, machine learning model data applier 70 may apply the identified hazardous condition and the data from one or more sensors to federated machine learning model 62. The identified hazardous condition and the data from one or more sensors are also known as "labeled data" or a "label". Alternatively, in response to hazardous condition classifier 68 classifying the identified hazardous condition as invalid, machine learning model data applier 70 may discard the identified hazardous condition and the data from one or more sensors. If the data applied to federated machine learning model 62 by machine learning model data applier 70 is properly and fully classified, system 60 may communicate with central machine learning model 100 so as to perform a consolidation of federated machine learning model 62 with central machine learning model 100 using machine learning model data applier 70. Alternatively, if the data applied to federated machine learning model 62 by machine learning model data applier 70 is not properly and fully classified, machine learning model 62 may be discarded by machine learning model data applier 70.

Figure 3:
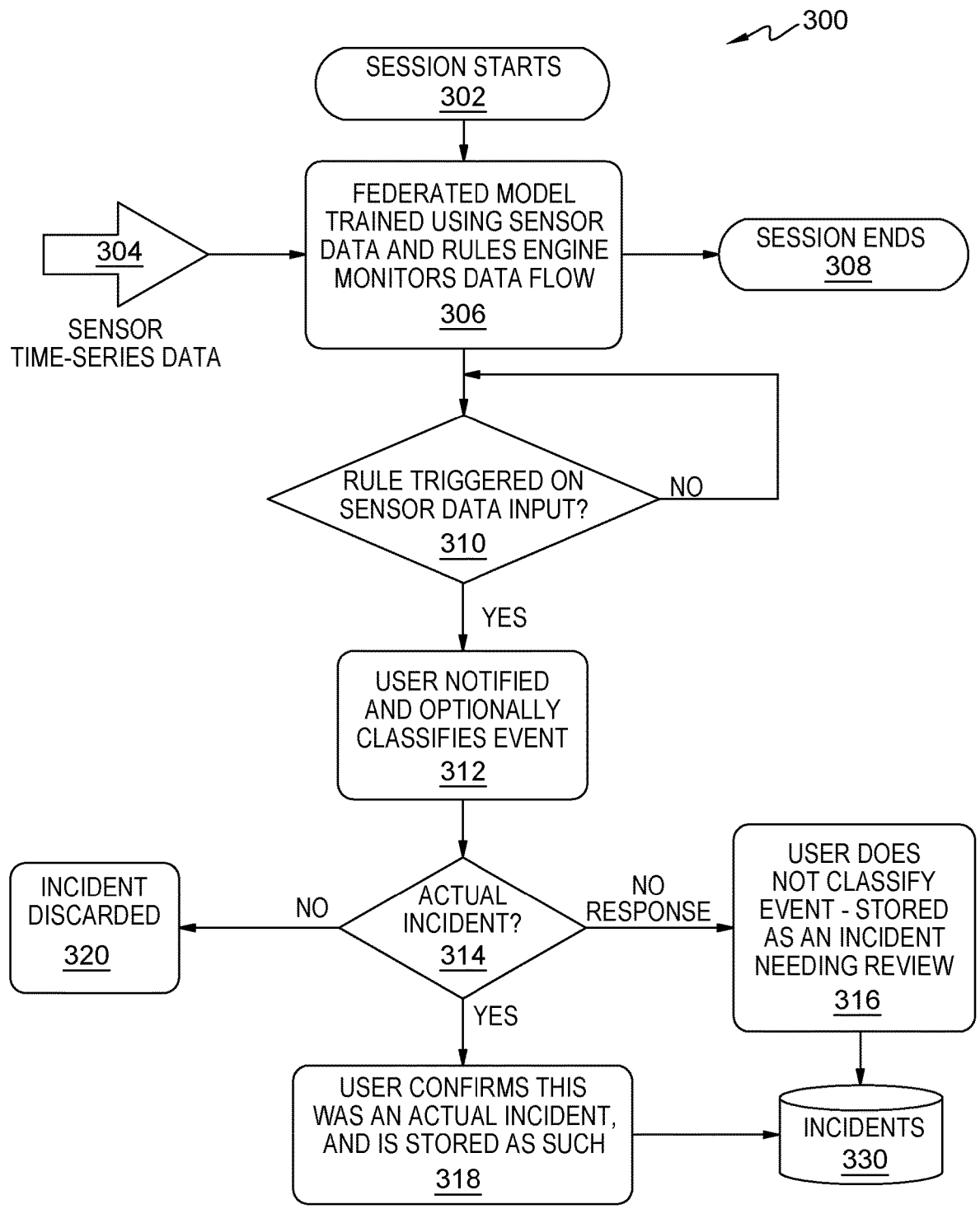
FIG. 3 shows a process workflow of a user for training a federated machine learning model according to illustrative embodiments.

Referring now to FIG. 3 in connection with FIG. 2, an illustrative embodiment, process workflow 300, is depicted that may be used by user 210 (shown in FIG. 2) to train federated machine learning model 62 (shown in FIG. 2). At 302, a user session starts. At 304, sensor time-series data is received sensor data receiver 64 (shown in FIG. 2) from one or more sensors $90_1$-$90_n$ (shown in FIG. 2). At 306, federated machine learning model 62 (shown in FIG. 2) is trained using sensor data from one or more sensors $90_1$-$90_n$ (shown in FIG. 2) and hazardous condition identifier 66 (shown in FIG. 2), implemented using one or more rules that are executed by a rules-engine, monitors a data flow from sensor data receiver 64 (shown in FIG. 2). At 308, the user session ends.

At 310, it is determined if a rule of hazardous condition identifier 66 (shown in FIG. 2) was triggered. If "no", additional data received from sensor data receiver 64 (shown in FIG. 2) is run through hazardous condition identifier 66 (shown in FIG. 2) at 310. If "yes", at 312 user 210 (shown in FIG. 2) is notified and prompted by hazardous condition classifier 68 (shown in FIG. 2) to optionally indicate a classification for an event identified by hazardous condition identifier 66 (shown in FIG. 2). At 314, it is determined if the event identified by hazardous condition identifier 66 (shown in FIG. 2) is an actual incident. If "no", the event or incident is discarded at 320. If "yes", at 318, user 210 (shown in FIG. 2) confirms that this event was an actual incident, and the incident is stored as such in incident database 330. If user 210 (shown in FIG. 2) does not indicate a classification, at 316, the event is stored in incident database 330 as an incident needing review.

Figure 4:
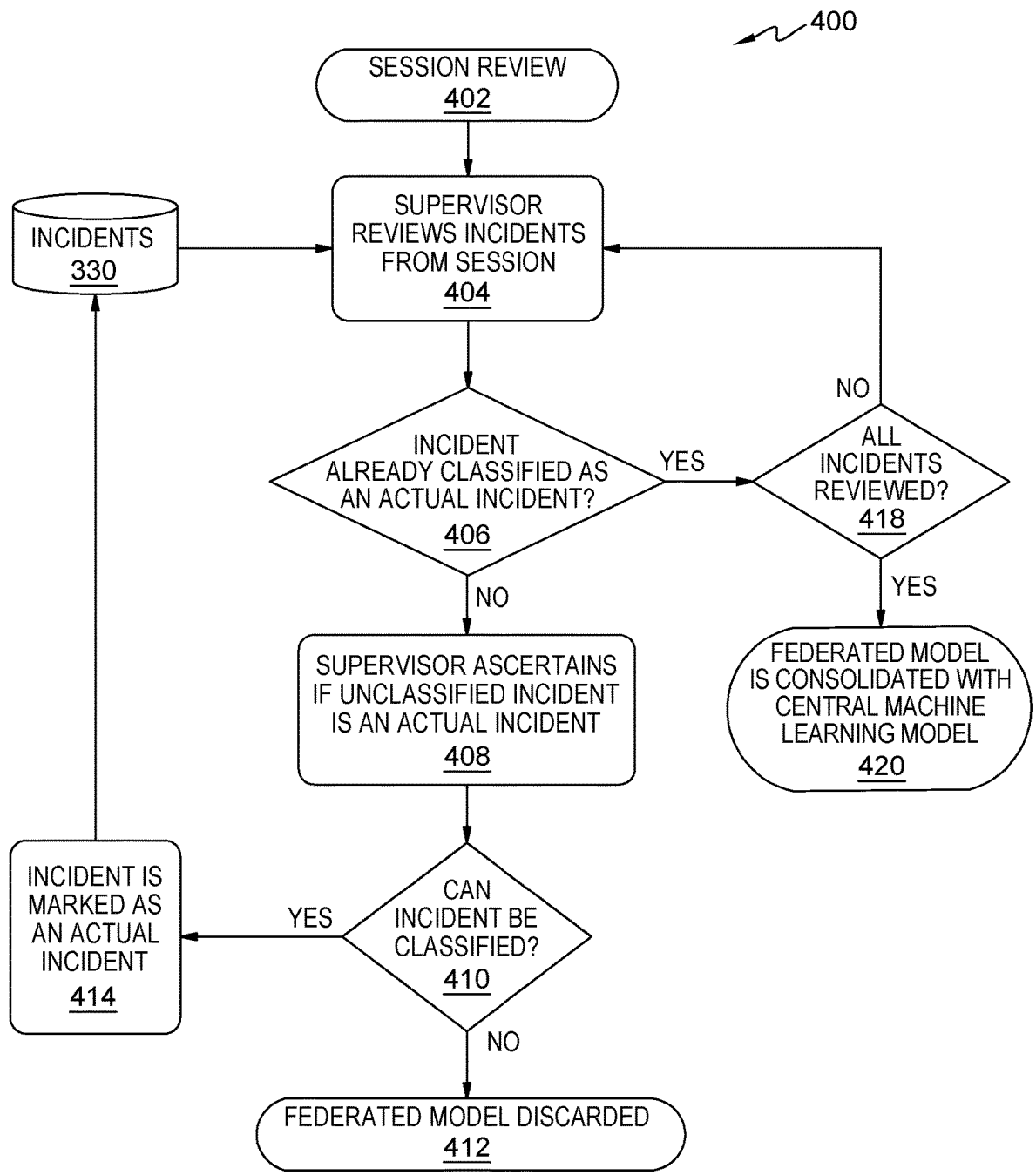
FIG. 4 shows a process workflow of a supervisor for training a federated machine learning model according to illustrative embodiments.

Referring now to FIG. 4 in connection with FIG. 2, an illustrative embodiment, process workflow 400, is depicted that may be used by supervisor 220 (shown in FIG. 2) to train federated machine learning model 62 (shown in FIG. 2). At 402, a session review starts. At 404, supervisor 220 (shown in FIG. 2) reviews incidents from a session that are stored in incident database 330. At 406, it is determined if an incident is already classified as an actual incident. If "yes", at 418, it is determined if all incidents have been reviewed. If "yes", at 420, machine learning model data applier 70 (shown in FIG. 2) sends federated machine learning model 62 (shown in FIG. 2) for consolidation with central machine learning model 100. If "no", supervisor 220 (shown in FIG. 2) continues at 404 to review reported incidents from a session that are stored in incident database 330.

Returning now to 406, if there is a "no" condition branch to 408, supervisor 220 (shown in FIG. 2) ascertains if an unclassified incident is an actual incident. At 410, it is determined if the incident can be classified. If "no", federated machine learning model 62 (shown in FIG. 2) is discarded at 412. If "yes", the incident is marked as an actual incident at 414, and is added to incident database 330.

Figure 5:
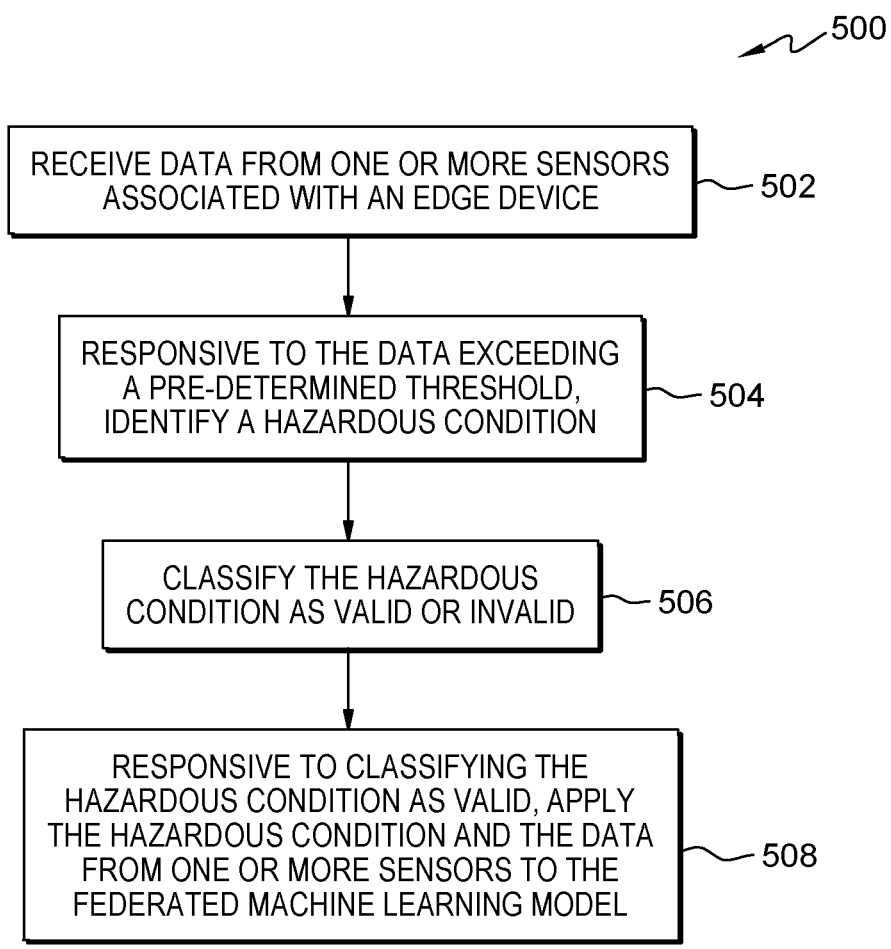
FIG. 5 shows a process flowchart for training a federated machine learning model according to illustrative embodiments.

Referring now to FIG. 5, in one embodiment, a system (e.g., computer system/server 12) carries out the methodologies disclosed herein. Shown is a process flowchart 500 for training a federated machine learning model. At 502, data is received from one or more sensors associated with an edge device. At 504, in response to the data exceeding a pre-determined threshold, a hazardous condition is identified. At 506, the hazardous condition is classified as valid or invalid. At 508, in response to the hazardous condition being classified as valid, the hazardous condition and the data from one or more sensors are applied to the federated machine learning model.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for training a federated machine learning model. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for training a federated machine learning model. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to training a federated machine learning model. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method comprising:
   training a federated machine learning model associated with an edge device, the training comprising:
   during a user session, monitoring data from one or more sensors associated with the edge device;
   responsive to detecting data from the monitored data exceeding a pre-determined threshold during the user session, identifying hazardous conditions corresponding to the detected data;
   responsive to the identifying, generating a prompt for a first hazardous condition of the hazardous conditions, the first hazardous condition corresponding to a first set of the detected data;
   classifying the first hazardous condition as valid or invalid based on a response to the prompt received during the user session; and
   applying a plurality of the hazardous conditions and corresponding sets of data from the detected data to the federated machine learning model, wherein the applying comprises:
   responsive to the classifying resulting in classifying the first hazardous condition as valid, applying the first hazardous condition and the corresponding first set of the detected data to the federated machine learning model;
   during a supervisor session carried out after the user session is complete, determining whether a hazardous condition from the applied plurality of hazardous conditions was not classified as valid during the user session; and
   based on a result of the supervisor session, determining whether the trained federated machine learning model can be consolidated with a central machine learning model.

2. The computer-implemented method of claim 1, the applying further comprising:
   responsive to a second hazardous condition of the hazardous conditions being classified as invalid, discarding the second hazardous condition and a corresponding second set of the data from the detected data.

3. The computer-implemented method of claim 1, further comprising, responsive to the result of the supervisor session being that all of the applied plurality of hazardous conditions were classified as valid, consolidating the trained federated machine learning model with the central machine learning model.

4. The computer-implemented method of claim 3, wherein the applied corresponding sets of the detected data are not shared with the central machine learning model.

5. The computer-implemented method of claim 1, wherein the identifying the hazardous conditions is performed by meeting one or more conditions defined in a rule, and wherein the rule is executed by a rules-engine.

6. The computer-implemented method of claim 5, wherein the hazardous conditions comprise at least one condition selected from the group consisting of: a fall event, an impact event, excessive heart rate, elevated blood pressure, lowered body temperature, elevated body temperature, elevated stress level, excessive fatigue, reduced oxygen level, elevated noxious gas level, and elevated sound level.

7. The computer-implemented method of claim 1, wherein the response to the prompt is an input received from a user of the edge device.

8. The computer-implemented method of claim 1, wherein the one or more sensors comprise at least one sensor selected from a group consisting of: an accelerometer, a gyroscopic sensor, a biometric sensor, an air quality sensor, a video imaging sensor, a radar/proximity sensor, and a microphone.

9. The computer-implemented method of claim 1, further comprising, responsive to the result of the supervisor session being that at least one hazardous condition of the applied plurality of hazardous conditions was not classified as valid, determining that the trained federated machine learning model cannot be consolidated with the central machine learning model.

10. A computer system, the computer system comprising:
a memory medium comprising program instructions;
a bus coupled to the memory medium; and
a processor for executing the program instructions, the processor coupled to a federated machine learning model training engine via the bus, wherein executing the program instructions causes the system to:
train a federated machine learning model associated with an edge device, wherein instructions for the training cause the system to:
during a user session, monitor data from one or more sensors associated with the edge device;
responsive to detecting data from the monitored data exceeding a pre-determined threshold during the user session, identify hazardous conditions corresponding to the detected data;
responsive to the identifying, generate a prompt for a first hazardous condition of the hazardous conditions, the first hazardous condition corresponding to a first set of the detected data;
classify the first hazardous condition as valid or invalid based on a response to the prompt received during the user session; and
apply a plurality of the hazardous conditions and corresponding sets of data from the detected data to the federated machine learning model, wherein instructions for the applying cause the system to:
responsive to the classifying resulting in classifying the first hazardous condition as valid, apply the first hazardous condition and the corresponding first set of the detected data to the federated machine learning model;
during a supervisor session carried out after the user session is complete, determine whether a hazardous condition from the applied plurality of hazardous conditions was not classified as valid during the user session; and
based on a result of the supervisor session, determine whether the trained federated machine learning model can be consolidated with a central machine learning model.

11. The computer system of claim 10, the instructions for the applying further causing the system to:
responsive a second hazardous condition of the hazardous conditions being classified as invalid, discard the second hazardous condition and a corresponding second set of the detected data.

12. The computer system of claim 10, the instructions further causing the system to, responsive to the result of the supervisor session being that all of the applied plurality of hazardous conditions were classified as valid, consolidate the trained federated machine learning model with the central machine learning model.

13. The computer system of claim 10, wherein the instructions to identify the hazardous conditions are performed by meeting one or more conditions defined in a rule, and wherein the rule is executed by a rules-engine.

14. The computer system of claim 13, wherein the hazardous conditions comprise at least one condition selected from the group consisting of: a fall event, an impact event, excessive heart rate, elevated blood pressure, lowered body temperature, elevated body temperature, elevated stress level, excessive fatigue, reduced oxygen level, elevated noxious gas level, and elevated sound level.

15. The computer system of claim 10, wherein the one or more sensors comprise at least one sensor selected from the group consisting of: an accelerometer, a gyroscopic sensor, a biometric sensor, an air quality sensor, a video imaging sensor, a radar/proximity sensor, and a microphone.

16. A computer program product comprising a computer readable hardware storage device and program instructions, stored on the computer readable hardware storage device, to:
train a federated machine learning model associated with an edge device, wherein instructions for the training comprise instructions to:
during a user session, monitor data from one or more sensors associated with the edge device;
responsive to detecting data from the monitored data exceeding a pre-determined threshold during the user session, identify hazardous conditions corresponding to the detected data;
responsive to the identifying, generate a prompt for a first hazardous condition of the hazardous conditions, the first hazardous condition corresponding to a first set of the detected data;
classify the first hazardous condition as valid or invalid based on a response to the prompt received during the user session; and
apply a plurality of the hazardous conditions and corresponding sets of data from the detected data to the federated machine learning model, wherein instructions for the applying comprise instructions to:
responsive to the classifying resulting in classifying the first hazardous condition as valid, apply the first hazardous condition and the corresponding first set of the detected data to the federated machine learning model;
in a supervisor session carried out after the user session is complete, determine whether a hazardous condition from the applied plurality of hazardous conditions has not been classified as valid; and
based on a result of the supervisor session, determine whether the trained federated machine learning model, without the detected data, can be consolidated with a central machine learning model.

17. The computer program product of claim 16, the instructions for the training further comprising instructions to:
responsive to a second hazardous condition of the hazardous conditions being classified as invalid, discard the second hazardous condition and a corresponding second set of the detected data.

18. The computer program product of claim 16, the computer readable hardware storage device further comprising instructions to, responsive to the result of the supervisor session being that all of the applied plurality of hazardous conditions were classified as valid, consolidate the federated machine learning model with the central machine learning model.

19. The computer program product of claim 16, wherein the program instructions to identify the hazardous conditions are performed by meeting one or more conditions defined in a rule, and wherein the rule is executed by a rules-engine, and wherein the hazardous conditions comprise at least one condition selected from the group consisting of: a fall event, an impact event, excessive heart rate, elevated blood pressure, lowered body temperature, elevated body temperature, elevated stress level, excessive fatigue, reduced oxygen level, elevated noxious gas level, and elevated sound level.

20. The computer program product of claim 16, wherein the response to the prompt is an input received from a user of the edge device.

\* \* \* \* \*